US012239922B1

(12) United States Patent
Joliet

(10) Patent No.: US 12,239,922 B1
(45) Date of Patent: Mar. 4, 2025

(54) CHILDREN'S TOY

(71) Applicant: Chase Joliet, Pasadena, CA (US)

(72) Inventor: Chase Joliet, Pasadena, CA (US)

( * ) Notice: Subject to any disclaimer, the term of this patent is extended or adjusted under 35 U.S.C. 154(b) by 0 days.

(21) Appl. No.: 18/770,211

(22) Filed: Jul. 11, 2024

(51) Int. Cl.
*A63H 33/26* (2006.01)
*F21V 23/04* (2006.01)
*F21V 23/06* (2006.01)

(52) U.S. Cl.
CPC ......... *A63H 33/26* (2013.01); *F21V 23/0485* (2013.01); *F21V 23/06* (2013.01)

(58) Field of Classification Search
CPC ... G09B 19/00-26; A63H 33/26; F21V 23/06; F21V 23/0485
USPC .................................................. 434/168-170
See application file for complete search history.

(56) References Cited

U.S. PATENT DOCUMENTS 2,416,959 A * 3/1947 Segal ........................ A63F 9/08 273/153 R
3,577,656 A * 5/1971 Lyon ........................ G09B 3/06 434/327
3,579,855 A * 5/1971 Worthy .................. G09B 5/062 434/308
3,625,149 A * 12/1971 Allen ...................... B41F 27/04 434/96
3,654,710 A * 4/1972 Barnard ................. G09B 19/00 446/485
3,707,783 A * 1/1973 Hajduk ................ G09B 19/025 708/670
3,740,869 A * 6/1973 Pleasants ............... G09B 7/063 434/338
3,748,748 A * 7/1973 Bevan ...................... G09B 5/04 434/318
4,158,264 A * 6/1979 Orth ....................... G09B 5/062 360/2
4,202,130 A * 5/1980 Smith .................... A63H 33/00 446/26
4,207,087 A * 6/1980 Morrison ............ A63F 3/00643 463/9
4,216,965 A * 8/1980 Morrison ............ A63F 3/00643 463/10
4,257,306 A * 3/1981 Laflamme ................ G10G 1/02 345/169
4,261,563 A * 4/1981 Goldfarb ............... A63F 9/0096 273/455

(Continued)

*Primary Examiner* — Alvin A Hunter
*Assistant Examiner* — Matthew B Stanczak
(74) *Attorney, Agent, or Firm* — The Van Winkle Law Firm; William G. Heedy

(57) ABSTRACT

A children's toy includes a user input panel having a first surface and a second surface, the first surface forming a plurality of switches and the second surface forming a plurality of sockets; each one of the plurality of switches being operable between at least a first position and a second position; a plurality of light bulbs, each one of the plurality of light bulbs including a bulb and a base having a magnetic element; each one of the plurality of sockets including an inner facing surface forming a channel that is sized and configured for congruent receipt of one of the plurality of light bulbs; wherein a currently sensed user input value is defined by the switch being in a first position or a second position; and wherein the magnetic coupling generates an output when the currently sensed user input value is the switch being in the second position.

20 Claims, 3 Drawing Sheets

(56) References Cited

U.S. PATENT DOCUMENTS

| | | | | | |
|---|---|---|---|---|---|
| 4,321,768 | A * | 3/1982 | Engehardt | A63H 33/00 | 40/550 |
| 4,333,258 | A * | 6/1982 | McCaslin | A63H 33/3055 | 446/481 |
| 4,382,795 | A * | 5/1983 | Collins | G09B 21/00 | 601/40 |
| 4,508,511 | A * | 4/1985 | McQueen | G09B 5/02 | 446/485 |
| 4,668,194 | A * | 5/1987 | Narayanan | G09B 5/065 | 434/335 |
| 4,702,476 | A * | 10/1987 | Ostergren | A63F 9/24 | 446/485 |
| 4,820,233 | A * | 4/1989 | Weiner | A63H 5/00 | 446/175 |
| 4,824,376 | A * | 4/1989 | Arash | G09B 5/00 | 434/327 |
| 4,863,386 | A * | 9/1989 | Maxey | G09B 7/00 | 434/304 |
| 4,968,255 | A * | 11/1990 | Lee | G09B 7/066 | 434/335 |
| 5,154,614 | A * | 10/1992 | Matsuoka | G09B 21/02 | 434/169 |
| 5,244,214 | A * | 9/1993 | Laatikainen | G07F 17/3211 | 273/460 |
| D348,483 | S * | 7/1994 | Chow | D21/324 | |
| 5,330,380 | A * | 7/1994 | McDarren | A63H 33/00 | 434/308 |
| 5,349,129 | A * | 9/1994 | Wisniewski | G10H 1/32 | 84/718 |
| 5,451,178 | A * | 9/1995 | Yorozu | G09B 15/00 | 446/175 |
| 5,484,288 | A * | 1/1996 | DelGigante | G09B 5/02 | 434/162 |
| 5,501,601 | A * | 3/1996 | Todokoro | G09B 5/062 | 434/164 |
| 5,694,045 | A * | 12/1997 | Ikeda | A63F 9/04 | 273/145 R |
| 5,735,693 | A * | 4/1998 | Groiss | G09B 19/06 | 434/335 |
| 5,813,861 | A * | 9/1998 | Wood | G09B 17/006 | 434/167 |
| 5,888,115 | A * | 3/1999 | Shoemaker, Jr. | G07F 17/3297 | 446/168 |
| 6,149,489 | A * | 11/2000 | Johnson | A63H 33/006 | 297/183.1 |
| 6,171,168 | B1 * | 1/2001 | Jessop | G09F 27/00 | 446/298 |
| 6,353,168 | B1 * | 3/2002 | Sosoka, Jr. | G10H 1/0008 | 446/408 |
| 6,623,273 | B2 * | 9/2003 | Evangelisti | G09B 19/04 | 434/156 |
| 6,659,836 | B1 * | 12/2003 | Yamasaki | G09B 1/06 | 446/175 |
| 6,719,603 | B2 * | 4/2004 | Chan | A63H 33/3055 | 446/481 |
| 6,991,509 | B1 * | 1/2006 | Carley | A63H 33/006 | 434/335 |
| 8,358,286 | B2 * | 1/2013 | Cannon | G06F 3/04883 | 345/174 |
| 8,814,625 | B1 * | 8/2014 | Long | A63H 5/00 | 446/175 |
| 8,961,184 | B1 * | 2/2015 | Banko | G09B 19/025 | 434/188 |
| 9,403,101 | B2 * | 8/2016 | Thomas | A63H 33/22 | |
| 10,173,142 | B2 * | 1/2019 | Chen | A63H 3/28 | |
| 11,604,534 | B2 * | 3/2023 | Vaarlid | G06F 3/0416 | |
| 11,862,132 | B2 * | 1/2024 | Helbert | G10H 1/26 | |
| 11,908,439 | B2 * | 2/2024 | Tougher | A63H 5/00 | |
| 2003/0218537 | A1 * | 11/2003 | Hoch | G06F 3/011 | 434/323 |
| 2004/0063078 | A1 * | 4/2004 | Marcus | G09B 7/00 | 434/167 |
| 2006/0046231 | A1 * | 3/2006 | Lin | G09B 17/00 | 434/169 |
| 2019/0022539 | A1 * | 1/2019 | Kamata | G09B 1/16 | |
| 2020/0292154 | A1 * | 9/2020 | Benn | H01R 33/18 | |

* cited by examiner

CHILDREN'S TOY

FIELD OF THE INVENTION

This invention relates to a children's toy including light switches and selectively removable light bulbs.

BACKGROUND

Toys play a crucial role in children's development by fostering various fundamental skills. Among these, the ability to identify cause and effect particularly stands out. Toys that encourage cause-and-effect understanding, such as simple mechanical toys or those with buttons that trigger responses, help children grasp the concept that actions lead to specific outcomes. This early comprehension lays a foundational understanding applicable to more complex learning later in life, from understanding scientific principles to predicting consequences in everyday situations.

Additionally, toys that aid in color association contribute significantly to cognitive development. Colorful toys not only attract a child's attention but also teach them to differentiate between colors and understand their names as they each correspond with a particular color. This skill forms the basis for later learning in art, design, and even language, where color descriptors are used extensively. Moreover, toys designed to teach shapes, letters, and numbers provide essential early education. Shape-sorters and puzzles enhance spatial awareness and problem-solving abilities, while alphabet and number toys introduce foundational literacy and numeracy skills crucial for academic success. These toys engage children in interactive learning experiences that are both enjoyable and effective, setting a solid educational framework from a young age.

SUMMARY

In accordance with one form of the invention, there is provided a children's toy including a user input panel having a first surface and a second surface, the first surface forming a plurality of switches and the second surface forming a plurality of sockets; each one of the plurality of switches being operable between at least a first position and a second position; a plurality of light bulbs, each one of the plurality of light bulbs including a bulb and a bulb base having a unique magnetic element; each one of the plurality of sockets including an inner facing surface forming a channel that is sized and configured for congruent receipt of one of the plurality of light bulbs; the inner facing surface of each of the plurality of sockets having a unique magnetically attractable surface configuration that corresponds with the unique magnetic element of one of the plurality of lightbulbs for actuating a magnetic coupling; wherein a currently sensed user input value is defined by the switch being in a first position or a second position; and wherein the magnetic coupling generates an output when the currently sensed user input value is the switch being in the second position.

In accordance with another form of the invention, there is provided a children's toy including a user input panel having a first surface and a second surface, the first surface forming a plurality of switches and the second surface forming a plurality of sockets; each one of the plurality of switches being operable between at least a first position and a second position; a plurality of light bulbs, each one of the plurality of light bulbs including a bulb and a base having a magnetic element; each one of the plurality of sockets including an inner facing surface forming a channel that is sized and configured for congruent receipt of one of the plurality of light bulbs; wherein a currently sensed user input value is defined by the switch being in a first position or a second position; and wherein the magnetic coupling generates an output when the currently sensed user input value is the switch being in the second position.

BRIEF DESCRIPTION OF THE DRAWINGS

For a fuller understanding of the nature of the present invention, reference should be made to the following detailed description, taken in conjunction with the accompanying drawings in which.

Like reference numerals refer to like reference parts throughout the several views of the drawings.

DETAILED DESCRIPTION

Figure 1:
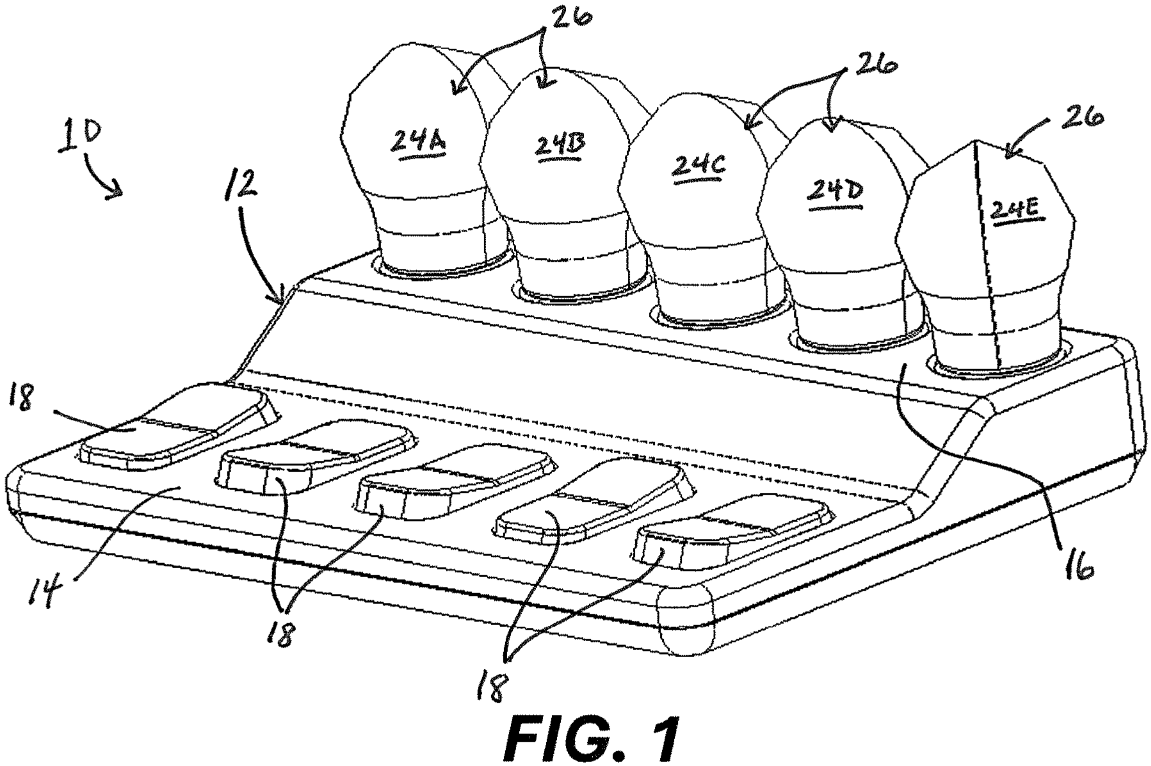
FIG. 1 is a perspective view of the children's toy.
Figure 2:
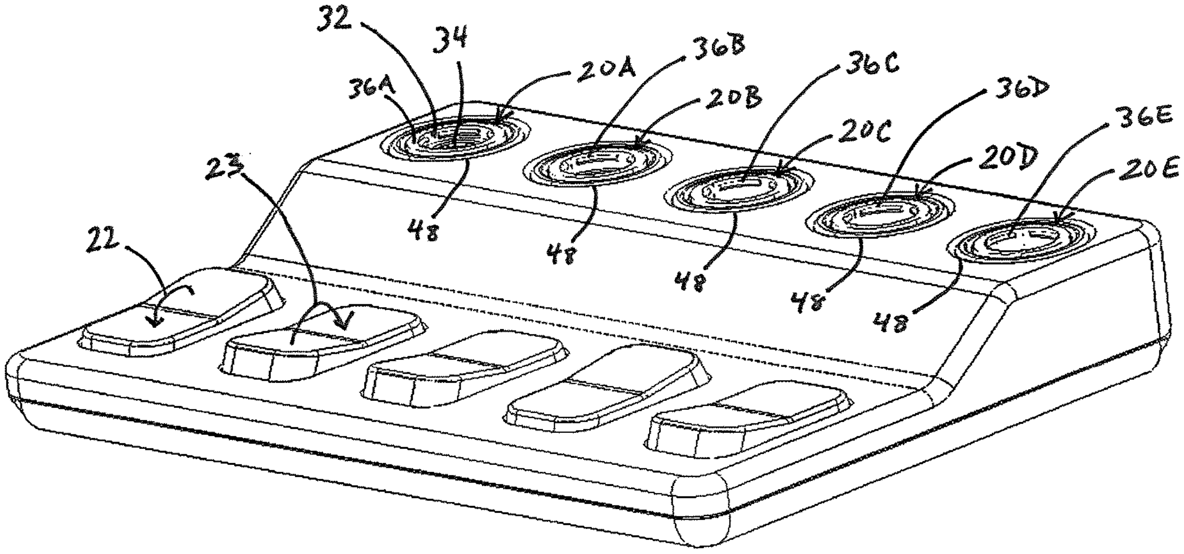
FIG. 2 shows the children's toy with no lightbulbs attached

Referring to the several views of the drawings, a children's development toy 10 is shown and described herein.

Referring initially to FIGS. 1-4, the children's toy 10 includes a user input panel 12 having a first surface 14 and a second surface 16. In accordance with one embodiment, the first surface 14 includes a plurality of switches 18 and the second surface 16 includes a plurality of sockets 20A-20E. Each one of the plurality of switches 18 is operable between at least a first position 22 and a second position 23. A plurality of light bulbs 24A-24E are provided. Each one of the plurality of light bulbs 24A-24E includes a bulb 26 and a bulb base 28 having a unique magnetic element 30A-30E. Each one of the plurality of sockets 20A-20E includes an inner facing surface 32 forming a channel 34 that is sized and configured for congruent receipt of the base 26 of one of the plurality of light bulbs 24A-24E. In one embodiment, the inner facing surface 32 of each of the plurality of sockets 20A-20E has a unique magnetically attractable surface configuration 36A-36E that corresponds with the unique magnetic element 30A-30E of one of the plurality of lightbulbs 24A-24E for actuating a magnetic coupling 38. In an embodiment, the first position 22 is defined as OFF and the second position 23 is defined as ON.

Figure 3A:
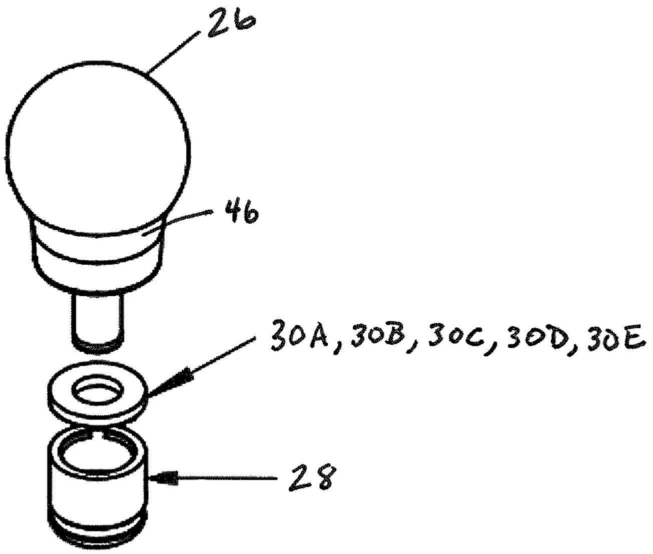
FIG. 3A shows a partially exploded view of the lightbulb.
Figure 3B:
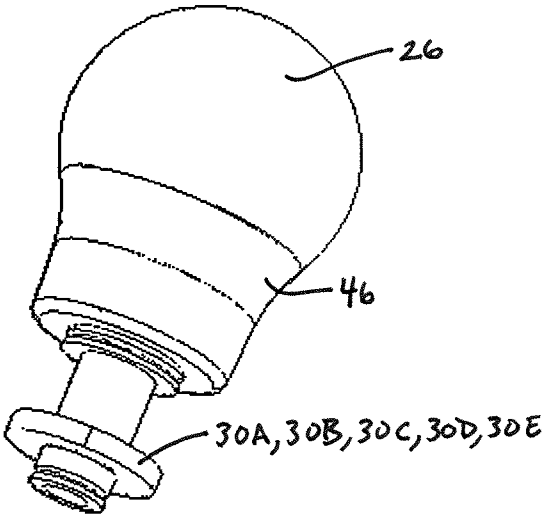
FIG. 3B shows the lightbulb with the base removed for purposes of more clearly showing the magnetic element.
Figure 3C:
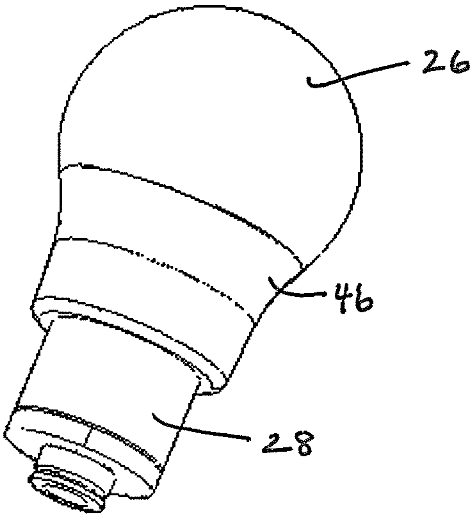
FIG. 3C shows the lightbulb.

With specific reference to FIGS. 3A, 3B and 3C, each lightbulb 24A-24E includes a bulb 26 that is coupled with a base 28 and a magnetic element 30A-30E. In an embodiment, the magnetic element 30A-30E is located at the top of base 28 adjacent bulb 26. In an embodiment, the magnetic element 30A-30E is located at the bottom of base 28. In an embodiment, each magnetic element 30A-30E is located on the base in a unique position that corresponds to only one of the plurality of sockets 20A-20E.

Figure 4:
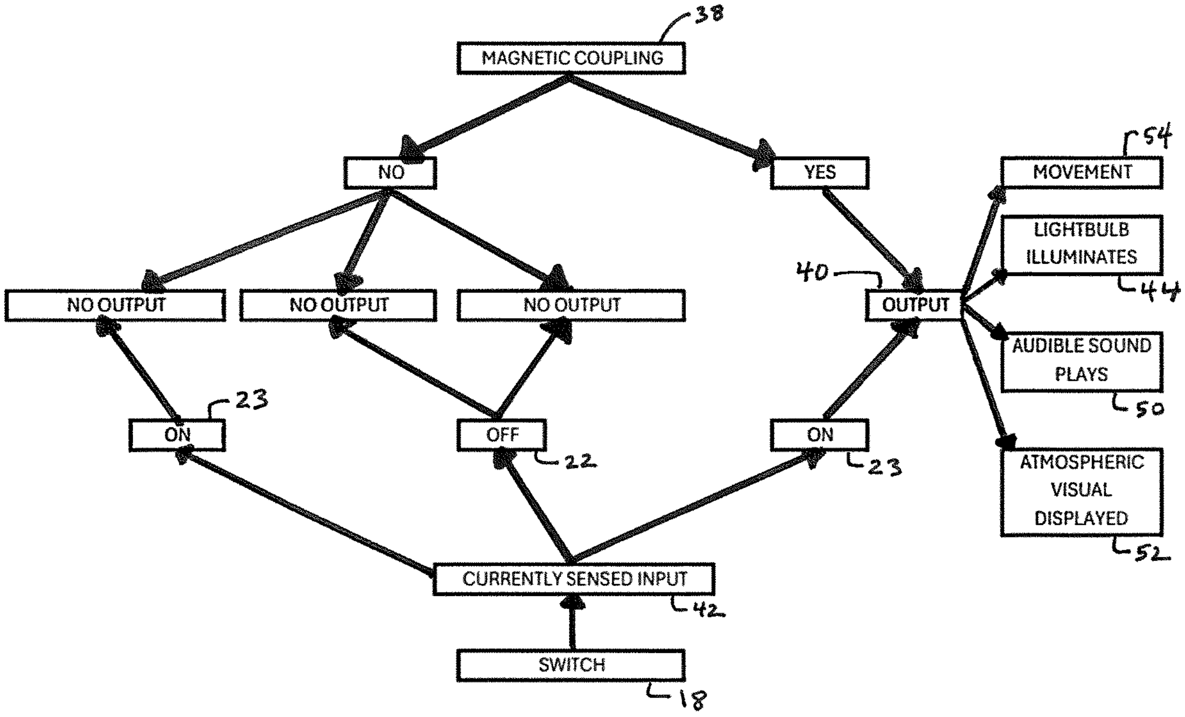
FIG. 4 is a flow chart illustrating the order of operations of the children's toy according to an embodiment.

In operation, and with reference to FIG. 4, the magnetic coupling 38 generates an output 40 based upon a currently sensed input value 42. In one embodiment, the currently sensed input value 42 is defined by the corresponding switch 18 being in the first position 22 or second position 23. Accordingly, the output 40 is dependent upon (1) the presence of a magnetic coupling 38 and (2) the switch 18 being in the first position 22 or the second position 23. For any given lightbulb 26A-26E-socket 20A-20E pairing and corresponding currently sensed input value 42, the magnetic coupling 38 being actuated and currently sensed input value 42 being in the second position (ON) 23 causes output 40 to occur. For any given lightbulb 26A-26E-socket 20A-20E pairing and corresponding currently sensed input value 42, the magnetic coupling 38 not being actuated and currently sensed input value 42 being in the second position (ON) 23 causes output 40 to not occur. For any given lightbulb 26A-26E-socket 20A-20E pairing and corresponding currently sensed input value 42, the magnetic coupling 38 not being actuated and currently sensed input value 42 being in the first position (OFF) 22 causes output 40 to not occur. For any given lightbulb 26A-26E-socket 20A-20E pairing and corresponding currently sensed input value 42, the magnetic coupling 38 being actuated and currently sensed input value 42 being in the first position (OFF) 22 causes output 40 to not occur.

In an embodiment, the output 40 is the corresponding light bulb 24A-24E illuminating 44.

In an embodiment of the above, each one of the plurality of light bulbs 24A-24E illuminates to a different color relative to the other ones of the plurality of light bulbs 24A-24E.

In an embodiment, each lightbulb 24A-E has a unique lightbulb identifier 46 on its bulb base 26 or bulb 28, such as a color, which matches a corresponding unique socket identifier 48 on the corresponding one of the plurality of sockets 20A-20E.

In an embodiment of the above, the unique lightbulb identifier 46 is the lightbulb 24A-24E being a particular color and the unique socket identifier 48 of the corresponding socket 20A-20E matching the particular color.

In an embodiment, the output 40 is an audible sound 50, such as a numeral, letter, word or a jingle, emitting.

In an embodiment of the above, the audible sound 50 produced is unique for each lightbulb 24A-24E and socket 20A-20E pairing.

In an embodiment of the above, the audible sound 50 produced by the output of each lightbulb 24A-24E and socket 20A-20E pairing is a letter which, taken together, spells a word.

In an embodiment of the above, the audible sound 50 produced by the output of each lightbulb 24A-24E and socket 20A-20E pairing is a word which, taken together, is a sentence.

In an embodiment, the output 40 is an atmospheric visual 52 being displayed.

In an embodiment, the output 40 is a movement 54 of an object that is either integrally formed with the children's toy 10 or connected via wire or wireless communication.

In an embodiment, the inner facing surface 32 of each of the plurality of sockets 20A-20E have the same magnetically attractable surface configuration and each of the plurality of light bulbs 24A-24E have the same magnetic elements 30A-30E, meaning that a magnetic coupling 38 is actuated when any one of the plurality of lightbulbs 24A-24E is inserted into any one of the plurality of sockets 20A-20E.

In an embodiment, each bulb 26 is a different shape relative to the other ones of the plurality of bulbs 26.

Each of the plurality of switches 18 may be any kind of suitable switch type, such as push button switch, rocker switch, or other suitable switch type.

While the drawings and description have shown five (5) lightbulbs 24A-24E and five (5) sockets 20A-20E, any number of lightbulbs 24A-24E and corresponding number of sockets 20A-20E may be used.

In an embodiment, the children's toy 10 may be used as an integral part of or an add-on for a boardgame or storyboard for the purposes of enhancing the experience. For example, a children's toy 10 equipped with a sensor in communication with a play piece of a board game would be able to generate an output 40 based upon the position of the play piece.

In an embodiment, each play piece includes a magnet for operating in combination with the plurality of sockets 20A-20E, thereby permitting each player playing the same game to have a unique experience from other players.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations may be well known in the art, and because they do not facilitate a better understanding of the present disclosure, a discussion of such elements and operations is not provided herein. The present disclosure is deemed to inherently include all such elements, variations, and modifications to the described aspects that would be known to those of ordinary skill in the art, particularly in view of reading the present disclosure. Any headings used herein are for organizational purposes only and are not meant to be used to limit the scope of the description or the claims.

The terminology used herein is for the purpose of describing particular example embodiments or implementations only and is not intended to be limiting. As used herein, the singular forms "a", "an", and "the" may be intended to include the plural forms as well, unless the context clearly indicates otherwise.

The terms "comprises," "comprising," "includes," "including," "has," "having," and variations in form thereof are inclusive or variations in form thereof are intended to be inclusive in a manner similar to the term "comprises" as that term is interpreted when employed as a transitional word in a claim, and therefore specify the presence of stated features, integers, steps, operations, elements, and/or components, but do not preclude the presence or addition of one or more other features, integers, steps, operations, elements, components, and/or groups thereof unless explicitly stated otherwise or the context clearly requires otherwise.

The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments and implementations.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments and implementations are contemplated, described herein, and set forth in the claims.

The term "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms "a," "an," and "the" are intended to include the plural forms as well, unless expressly stated otherwise or the context indicates otherwise.

The terms "includes," "has," "having," or "exhibits," or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items.

As used herein, phrases such as "between X and Y" and "between about X and Y" should be interpreted to include X and Y unless expressly stated otherwise or the context clearly indicates otherwise.

Terms such as "about", "approximately", "around", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While terms such as vertical, horizontal, upper, lower, bottom, top, and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments and implementations preferably or optionally include certain features, elements and/or steps, while some other embodiments and implementations optionally do not include those certain features, elements and/or steps. Thus, such conditional language indicates, in general, that those features, elements and/or steps are used in a permissive sense rather than a mandatory sense, and may not be required for every implementation or embodiment.

The subject matter described herein is provided by way of illustration only and should not be construed as limiting the nature and scope of the claims herein. While different embodiments and implementations have been provided above, it is not possible to describe every conceivable combination of components or methodologies for implementing the disclosed subject matter, and one of ordinary skill in the art may recognize that further combinations and permutations that are possible. Furthermore, the nature and scope of the claims is not necessarily limited to implementations that solve any or all disadvantages which may have been noted in any part of this disclosure. Various modifications and changes may be made to the subject matter described herein without departing from the spirit and scope of, the exemplary embodiments, implementations, and applications illustrated and described herein.

Although the subject matter presented herein has been described in language specific to components used therein, it is to be understood that the scope of the claims is not necessarily limited to the specific components or characteristics thereof described herein; rather, the specific components and characteristics thereof are disclosed as example forms of implementing the disclosed subject matter. Accordingly, the disclosed subject matter is intended to embrace all alterations, modifications, and variations, that fall within the scope and spirit of any claims included herein or that may be written.

The foregoing Detailed Description is intended only to convey to a person having ordinary skill in the art the fundamental aspects of the disclosed subject matter and is not intended to limit, and should not be construed as limiting, the scope of any claims. Further, in the foregoing Detailed Description, various features may be grouped together in a single embodiment or implementation for the purpose of streamlining the disclosure. This method of disclosure is not to be interpreted as reflecting an intention that a claimed embodiment, implementation, or application requires more features than are expressly recited in a claim. Rather, claims reflect patentable subject matter which may lie in less than all features of a single disclosed embodiment, implementation, or application. Thus, all claims which may be present herein are hereby incorporated into the Detailed Description, with each claim standing on its own as a separate embodiment, implementation, or application.

The invention claimed is:

1. A children's toy comprising:

a user input panel including a first surface and a second surface, the first surface forming a plurality of switches and the second surface forming a plurality of sockets;

each one of the plurality of switches being operable between at least a first position and a second position;

a plurality of lightbulbs, each one of the plurality of lightbulbs including a bulb and a base having a unique magnetic element;

each one of the plurality of sockets including an inner facing surface forming a channel that is sized and configured for congruent receipt of one of the plurality of lightbulbs to create a lightbulb pairing;

the inner facing surface of each of the plurality of sockets having a unique magnetically attractable surface configuration that corresponds with the unique magnetic element of one of the plurality of lightbulbs for actuating a magnetic coupling;

wherein a currently sensed user input value is defined by the switch being in a first position or a second position; and wherein the magnetic coupling generates an output when the currently sensed user input value is the switch being in the second position.

2. The children's toy as recited in claim 1 wherein the output is the corresponding lightbulb illuminating.

3. The children's toy as recited in claim 2 wherein each of the plurality of lightbulbs illuminates a different color.

4. The children's toy as recited in claim 1 wherein the output is an audible sound being played.

5. The children's toy as recited in claim 4 wherein the audible sound emitted is unique for each lightbulb and socket pairing.

6. The children's toy as recited in claim 4 wherein the audible sound emitted by the output of each lightbulb and socket pairing is a letter which, taken together, spells a word.

7. The children's toy as recited in claim 4 wherein the audible sound emitted by the output of each lightbulb and socket pairing is a word which, taken together, is a sentence.

8. The children's toy as recited in claim 1 wherein the output is an atmospheric visual being displayed.

9. The children's toy as recited in claim 1 wherein each of the plurality of lightbulbs has a unique lightbulb identifier which matches a corresponding unique socket identifier on the corresponding one of the plurality of sockets.

10. The children's toy as recited in claim 9 wherein the unique lightbulb identifier is the lightbulb being a particular color and the unique socket identifier of the corresponding socket matching the particular color.

11. A children's toy comprising:

a user input panel including a first surface and a second surface, the first surface forming a plurality of switches and the second surface forming a plurality of sockets;

each one of the plurality of switches being operable between at least a first position and a second position;

a plurality of lightbulbs bulbs, each one of the plurality of lightbulbs including a bulb and a base having a magnetic element;

each one of the plurality of sockets including an inner facing surface forming a channel that is sized and configured for congruent receipt of one of the plurality of lightbulbs to create a lightbulb pairing for actuating a magnetic coupling;

wherein a currently sensed user input value is defined by the switch being in a first position or a second position; and wherein the magnetic coupling generates an output when the currently sensed user input value is the switch being in the second position.

12. The children's toy as recited in claim 11 wherein the output is the corresponding lightbulb illuminating.

13. The children's toy as recited in claim 12 wherein each of the plurality of lightbulbs illuminates a different color.

14. The children's toy as recited in claim 11 wherein the output is an audible sound being played.

15. The children's toy as recited in claim 14 wherein the audible sound emitted is unique for each lightbulb and socket pairing.

16. The children's toy as recited in claim 14 wherein the audible sound emitted by the output of each lightbulb and socket pairing is a letter which, taken together, spells a word.

17. The children's toy as recited in claim 14 wherein the audible sound emitted by the output of each lightbulb and socket pairing is a word which, taken together, is a sentence.

18. The children's toy as recited in claim 11 wherein the output is an atmospheric visual being displayed.

19. The children's toy as recited in claim 11 wherein each of the plurality of lightbulbs has a unique lightbulb identifier which matches a corresponding unique socket identifier on the corresponding one of the plurality of sockets.

20. The children's toy as recited in claim 19 wherein the unique lightbulb identifier is the lightbulb being a particular color and the unique socket identifier of the corresponding socket matching the particular color.

* * * * *